(12) United States Patent
Morris (10) Patent No.: US 7,377,597 B2
(45) Date of Patent: May 27, 2008

(54) WHEEL ASSEMBLY HAVING WHEEL-MOUNTING SLEEVE AND RETAINER

(75) Inventor: Michael A. Morris, Rancho Palos Verdes, CA (US)

(73) Assignee: GEO Plastics, Los Angeles, CA (US)

( * ) Notice: Subject to any disclaimer, the term of this patent is extended or adjusted under 35 U.S.C. 154(b) by 283 days.

(21) Appl. No.: 11/059,153

(22) Filed: Feb. 15, 2005

(65) Prior Publication Data

US 2006/0181141 A1    Aug. 17, 2006

(51) Int. Cl.
*B60B 27/06* (2006.01)
*B60B 37/10* (2006.01)

(52) U.S. Cl. ............... 301/121; 301/119; 301/122; 301/111.04

(58) Field of Classification Search .......... 301/111.01, 301/112, 118, 119, 120, 121, 122, 111.04
See application file for complete search history.

(56) References Cited

U.S. PATENT DOCUMENTS

| | | | |
|---|---|---|---|
| 289,627 A * | 12/1883 | Crabtree | .................. 301/120 |
| 333,621 A * | 1/1886 | Garben | .................. 301/121 |
| 334,049 A * | 1/1886 | Raddin | ................. 301/111.03 |
| 486,023 A | 11/1892 | Bermel | |
| 897,444 A * | 9/1908 | Ballif | .................. 301/113 |
| 921,912 A * | 5/1909 | Thede | .................. 301/121 |
| 2,978,277 A | 4/1961 | Gaudry | |
| 3,907,370 A | 9/1975 | Bard | |
| 5,215,356 A | 6/1993 | Lin | |
| 5,222,786 A | 6/1993 | Sovis et al. | |
| 5,277,480 A | 1/1994 | Chiu | |
| 5,603,555 A | 2/1997 | Dickey et al. | |
| 5,716,107 A * | 2/1998 | Parker et al. | ........... 301/111.07 |
| 5,902,018 A | 5/1999 | Owen et al. | |
| 6,099,083 A | 8/2000 | Logan | |
| 6,170,920 B1 | 1/2001 | Markling | |
| 6,234,582 B1 * | 5/2001 | Wu | ................. 301/111.06 |
| 6,280,001 B1 | 8/2001 | Parker et al. | |
| 6,299,258 B1 | 10/2001 | Wright et al. | |
| 6,361,121 B1 | 3/2002 | Morris | |
| 6,375,274 B1 | 4/2002 | Morris | |

(Continued)

FOREIGN PATENT DOCUMENTS

EP    0180307 A1    5/1986

OTHER PUBLICATIONS

U.S. Appl. No. 10/835,653, Morris.

*Primary Examiner*—Russell D. Stormer
(74) *Attorney, Agent, or Firm*—Knobbe, Martens, Olson & Bear, LLP (57) ABSTRACT

A wheel-mounting sleeve and retainer is described. The wheel-mounting sleeve includes a sleeve body, formed and dimensioned for mounting through a wheel-bearing bore in a wheel and into telescoped relation over an axle having a retaining notch. The wheel-mounting sleeve includes at least one retainer discrete from the sleeve body. The retainer includes monolithic spring and lug portions, and is coupled to the sleeve body such that the lug portion is resiliently positionable through a port in the sleeve body and into the axle bore to a detent position wherein the lug portion engages the retaining notch of the axle to constrain the axle within the axle bore. A method of using the wheel-mounting sleeve and retainer is also described.

21 Claims, 8 Drawing Sheets

U.S. PATENT DOCUMENTS 6,409,283 B1  6/2002  Hsieh
6,561,593 B2 *  5/2003  Godwin ................. 301/111.04
6,637,835 B2  10/2003  Morris
6,910,742 B2 *  6/2005  Flood et al. ................. 301/119

* cited by examiner

WHEEL ASSEMBLY HAVING WHEEL-MOUNTING SLEEVE AND RETAINER

TECHNICAL FIELD

This invention relates, in general, to wheel assemblies, and the manner of mounting and removing such assemblies to and from an axle. More particularly, this invention relates to plastic wheel assemblies for use on carts or the like, and the manner of mounting and removing such wheel assemblies to and from a cart's axle.

BACKGROUND

Useful conveyances with inexpensive plastic wheels are ubiquitous. In the home, for example, most households have utilitarian wheeled garbage or recyclables carts. Many households also have more luxurious wheeled barbeques or wheeled furniture. Similar products are in the workplace as well.

In many applications, such products are subject to a harsh environment and use, with minimal or no maintenance. Trash or recyclables carts may be left outdoors permanently and are thereby subject to extremes of temperature and sunlight. Moreover, rough handling is common, such as that which occurs when loaded garbage carts roll over curbs and other obstacles.

Typically, such carts are formed of injection, blow, or rotationally-molded plastic and have injection, blow, or rotationally-molded plastic wheels, which are mounted on the ends of a metal axle by a hub member. To hold the wheels in place, the wheel hub is secured onto the end of the axle in place by, for example, a pawl nut or a cotter pin and washer. Removal of such plastic wheels in order to replace or repair the same has been difficult because the hubs require special tools for their removal or essentially must be destroyed to remove them from the axle. Sometimes this process also damages the axles. Thus, more recently, wheel-mounting assemblies have been devised which snap onto the axle or axle stub to hold the wheel to the axle.

Snap-on wheel-mounting assemblies, however, often have been unduly complex, visually unappealing or not well suited to the shock loading and vibration, which is commonly encountered in connection with wheeled refuse carts. Moreover, the cost of many snap-on couplings has been undesirably high, as has their rate of failure.

Typical wheel-mounting assemblies can be seen in U.S. Pat. Nos. 2,978,277, 3,907,370, 5,222,786, 5,603,555, 5,716,107, and 6,170,920.

In U.S. Pat. No. 2,978,277 to Gaudry, a two-piece hub assembly is used to secure a wheel on an axle stub. The two hub halves are forced together to simultaneously capture the head of the axle and a dove-tailed cross section of the wheel. This approach is based, in part, upon mating frictional engagement of the hub halves, but under shock loading and high vibration, which refuse carts typically experience, frictional engagement of components can be unreliable. The need for multiple hub pieces and an axle with an enlarged head also is not desirable.

The wheel-mounting assembly of U.S. Pat. No. 3,907,370 to Bard employs a mounting sleeve, which is keyed to slide over the keyed end of a specially formed axle. The sleeve mates with spokes in a wheel recess and is held in place by a washer and cotter pin. An annular cap is placed over the cotter pin and washer. This approach requires axle keying, a plurality of parts and the use of tools to secure and release the cotter pin and cap.

A multiple piece hub assembly is shown in U.S. Pat. No. 5,716,107 to Parker et al. In this wheel-mounting assembly a retainer member is used to lock the wheel assembly on a groove or annular notch at the end of the axle. The hub cover is snapped into the wheel and then the wheel snapped onto the axle. Such notched or grooved axles are in wide spread use in connection with trash carts, but this assembly, again, requires multiple pieces and, in this case, special tools and tedious manipulation are required in order to release the resilient retainer ring fingers from the inside of the wheel so that the wheel can be removed from the axle.

The devices of U.S. Pat. Nos. 5,222,786 and 5,603,555 employ sleeve assemblies formed for mounting through the wheel in telescoped relation over the axle. The device of U.S. Pat. No. 5,603,555 has a sleeve with at least one snap-acting, axle-engaging shoulder thereon which releasably retains the sleeve on the axle and at least one wheel-engaging shoulder retaining the wheel on the sleeve. Both of the wheel-mounting sleeve assemblies in these patents, however, are relatively complex and employ a plurality of pieces in order to secure the wheel on the axle.

U.S. Pat. No. 6,170,920 to Markling shows an axle retainer assembly having a housing with transverse sleeves that support an axle and a spring biased retainer pin that mounts to an annular groove at the axle. The spring and retainer pin are separate, and the housing is supported in a cavity formed in a wheel spoke. Just as with the devices of U.S. Pat. Nos. 5,222,786 and 5,603,555, Markling disadvantageously employs multiple pieces in order to secure the wheel on the axle.

Accordingly, there is a need for a wheel assembly and wheel-mounting sleeve that can be used to mount plastic wheels, or the like, to a relatively simple notched metal axle.

Moreover, there is a need for a plastic wheel assembly for a trash cart or the like which is economical to manufacture, easy to mount and compact so as to allow its use on a wide variety of different refuse carts, and is durable and capable of withstanding substantial shock loads, side-to-side shifting and vibration during normal use. Should degradation or failure occur, there is a further need for products that may be removed to enable repair or replacement of the wheel assembly with a minimal number of parts.

SUMMARY

In one aspect, the wheel-mounting sleeve of this invention includes a sleeve body that is formed and dimensioned for mounting through a wheel-bearing bore in a wheel and into telescoped relation over an axle having a retaining notch. The sleeve body has an inner end and an outer end with an axle bore between the ends. The axle bore is dimensioned for receiving the axle in telescoped relation. The sleeve body is in part characterized by having a port formed and dimensioned for access to the retaining notch of the axle when the axle is positioned in the axle bore. The sleeve is further characterized by having at least one retainer discrete from the sleeve body, which retainer includes monolithic spring and lug portions and couples to the sleeve body such that the lug portion is resiliently positionable through the port and into the axle bore to a detent position at which the lug portion engages the retaining notch of the axle to constrain the axle within the axle bore.

In another aspect, a wheel-mounting sleeve for use with an axle having a retaining notch includes a sleeve body, which is formed and dimensioned for mounting through a wheel-bearing bore in a wheel and retaining the wheel on the sleeve. The sleeve body has an inner end and an outer end with an axle bore between the ends. The bore is formed and dimensioned for receiving the axle in telescoped relation. Further, the wheel-mounting sleeve includes at least one retainer having monolithic spring and lug portions. Each retainer is discrete from the sleeve body. Still further, the sleeve body has a port formed and dimensioned to receive the lug portion, and the spring portion is formed and dimensioned to resiliently position the lug portion of the at least one retainer relative to the axle bore to form a latch between the sleeve body and the axle.

In still another aspect, an assembly includes an optional axle having a notch located inward along the axle from an axle tip and a wheel having a central wheel-bearing bore extending through from an inner side to an outer side of the wheel. The assembly also includes structure for supporting the wheel on the axle with access to the notch; and at least one retainer discrete from the wheel support structure, which retainer has monolithic spring and lug structures. The spring structure resiliently positions the at least one retainer relative to the axle bore such that the lug structure forms a latch between the wheel and the axle.

In yet another aspect, an assembly includes an optional axle having a notch located inward along the axle from an axle tip and a wheel assembly having a wheel support, which is positioned on the axle and provides access to the notch. Moreover, the assembly further includes at least one retainer discrete from the wheel support, the retainer having monolithic spring structures and lug structures. The spring structures resiliently position each retainer relative to the axle bore such that the lug structure forms a latch between the wheel and the axle.

The wheel assembly with a wheel-mounting sleeve and retainer of the present invention has other features and advantages which will be apparent from or are set forth in more detail in the accompanying drawings, which are incorporated in and form a part of this specification, and the following Detailed Description, which together serve to explain the principles of the present invention.

BRIEF DESCRIPTION OF THE DRAWINGS

FIG. 3(*a*)-(*f*) is a series of cut-away views illustrating assembly of the sleeve body of FIG. 2 and a corresponding retainer.

FIG. 4(*a*)-(*d*) is a series of side and sectional views illustrating details of the sleeve body of FIG. 2.

FIG. 5(*a*)-(*c*) is a series of views illustrating the retainer of FIG. 3.

FIG. 6(*a*)-(*c*) is a series of views illustrating a modified retainer similar to that shown in FIG. 3.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
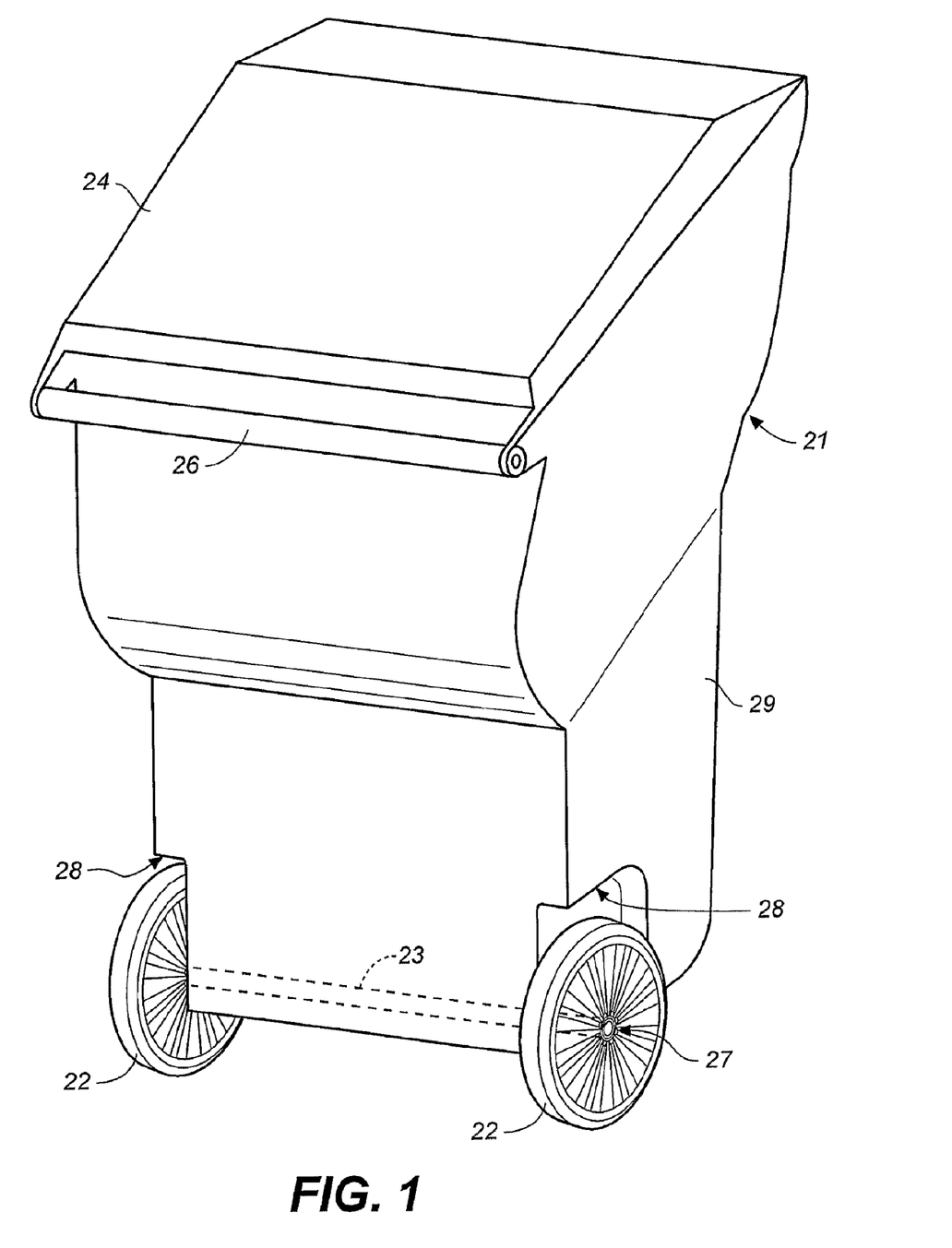
FIG. 1 is a perspective view of a cart body, wheels, and axle assembled in accordance with this invention.

FIG. 1 is a perspective view of an assembled cart body, wheels, and axle. In FIG. 1, cart 21 includes a pair of wheels 22 mounted on an axle 23 to the lower end of the cart body 29. A wheel-mounting sleeve, generally designated 27, secures each wheel on the axle. In this embodiment, the body of the cart includes a wheel well or recess area 28 which receives the wheels, in part to protect the wheels and in part as a cosmetic structure. Many other styles of carts, however, do not include wheel wells. A hinged lid 24 is also optional. The cart can be tilted or tipped about the wheels using handle 26 so as to enable rolling of the cart for the transport of refuse, for example, between a location for filling the cart and a location for pickup by a refuse disposal company.

The wheeled cart in FIG. 1 is typical, but not limiting. As will be readily. apparent, the presently described wheel-mounting sleeve and wheel assembly can be used in numerous wheeled devices.

Figure 2:
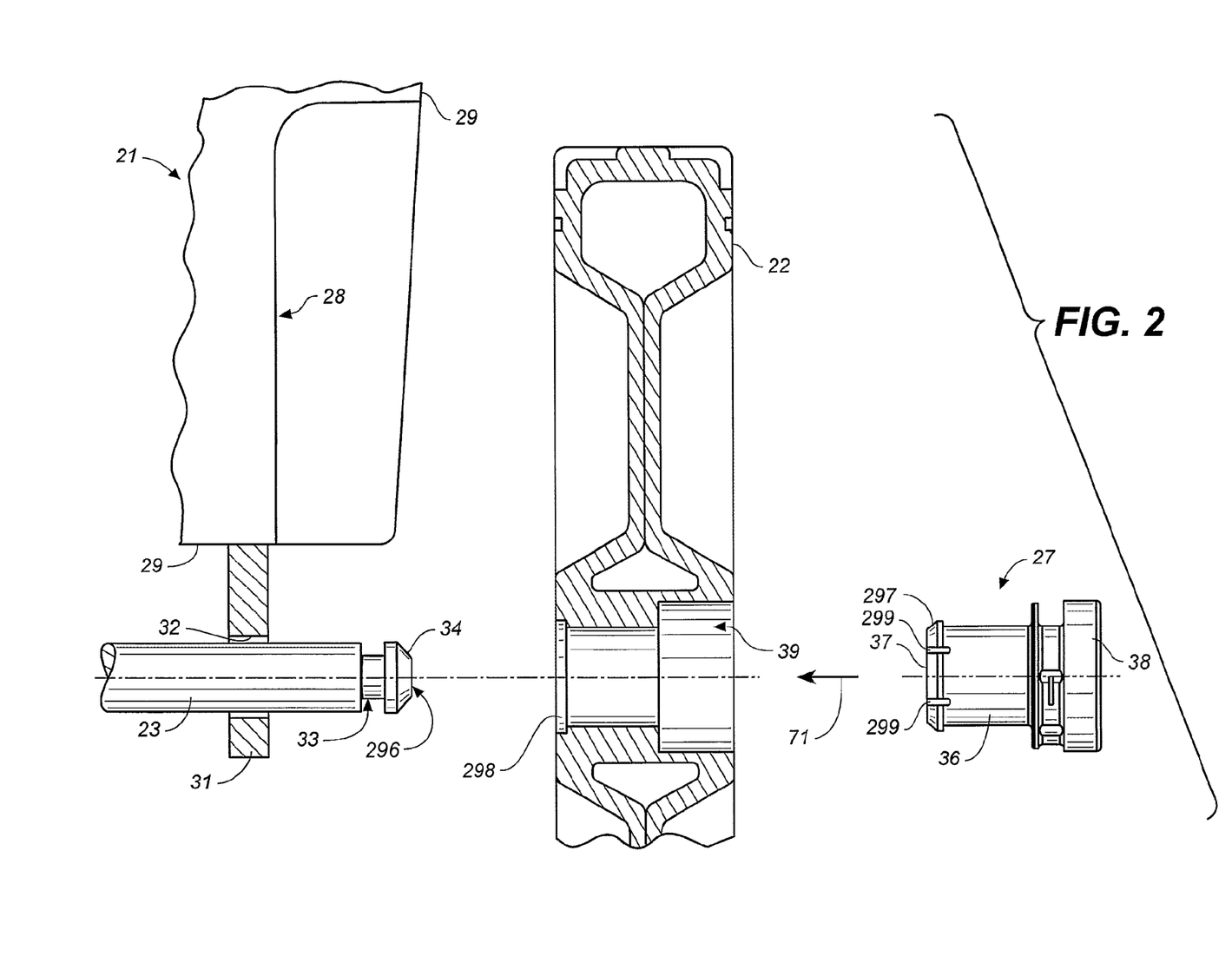
FIG. 2 is an exploded assembly drawing of the cart body, wheel, axle, and sleeve body of FIG. 1 in accordance with this invention.

FIG. 2 is an assembly drawing of a cart body, wheels, and axle, which is in accord with one embodiment of the invention. In FIG. 2, a downwardly-depending ear 31 mounts axle 23 to cart body 29. Typically, there is a plurality of ears 31, for example four across the width of the cart body. Each ear includes an ear bore 32, which receives the axle. In different embodiments, the ear bore has a dimension such that the axle does or does not rotate in the ear bore.

An important feature of the wheel assembly and mounting sleeve of the presently described invention is that it can be used with, and retrofit to, a wide variety of different carts and other wheeled devices. While different manufacturers of refuse carts and similar wheeled devices employ varying cart configurations and manners of mounting support wheels to a cart, one element which virtually all cart manufacturers use is a grooved or notched axle.

As shown in FIG. 2, axle 23 typically includes an annular groove or notch 33 proximate each end or axle tip 296. Moreover, the ends or axle tips are typically, but not universally, chamfered at 34 so as to facilitate insertion of the axle into wheel-bearing bores and various mounting structures. The axle is usually formed of carbon steel in order to have sufficient strength and shock resistance for support of substantial loads in the cart.

Cart manufacturers often buy plastic wheel assemblies from outside suppliers. Wheel assembly suppliers, therefore, are able to construct a wheel which mounts to a standard industry axle 23 using various wheel-mounting structures, and the cart manufacturers assemble the same to form cart 21.

Referring still to FIG. 2, wheel-mounting sleeve 27 includes sleeve body 36 having an inner end 37, which is nearer to cart 21, and an outer end 38, which is farther from the cart. The sleeve body is formed and dimensioned for mounting through a wheel-bearing bore, generally designated 39, in wheel 22. The mounting sleeve may be monolithically formed as a one-piece member from a relatively impact-resistant plastic. This can be accomplished by fabricating the mounting sleeve by injection-molding processes utilizing plastic such as an acetyl-based copolymer, high-density polyethylene (HDPE) or low-density polyethylene (LDPE). One will appreciate that the wheel-mounting sleeve may be formed with other suitable materials and/or by other suitable means.

Many suppliers employ simple press-fitting in the direction of arrow 71 to join a wheel and a sleeve body in an assembly, which then is ready for use by a cart manufacturer. To facilitate passage during fitting, the sleeve body preferably includes at least one longitudinally extending slot 299 to enable deformation of the sleeve body as it passes through the wheel-bearing bore. A slot is not required, however, if the sleeve material is sufficiently pliable. The wheel-bearing bore preferably includes a circumferentially extending chamfer 298 and the sleeve body preferably includes a beveled circumferential rib 297. Together, opposing circumferential faces of the chamfer and the rib ensure the wheel and the sleeve body remained joined while in use. Other embodiments employ a key-like structure on the sleeve body and a corresponding recess in the wheel to join the wheel and sleeve body. See, for example, my patents, infra.

To complete assembly according to FIG. 2, sleeve body 36 (along with joined wheel 22) slides over axle 23 in the direction of arrow 71. As the sleeve body includes an axle bore (not visible in FIG. 2 but shown in following figures), the sliding engagement is as a collapsible telescope or radio antenna moves. Once positioned by sliding, a lug (also not visible in FIG. 2 but shown in following figures) secures the sleeve body and wheel together with the axle.

In some aspects, the axle/sleeve body/wheel configuration of the present invention is similar to that described in U.S. Pat. Nos. 6,375,274, 6,361,121, 6,637,835, and 7,108,335, which patents are hereby incorporated in their entirety herein by this reference.

The presently described invention includes a retainer that is discrete from and removably engagable with the sleeve body. Being discrete from the sleeve body, the retainer may be formed from metal and other suitable materials, which materials may be selected to be more rugged and hard-wearing than plastics. This enables improved performance with respect to uncontrolled environments and with respect to rough handling anywhere. Further, should degradation or failure occur, the discrete retainer is removable and easily replaceable.

Figure 3:
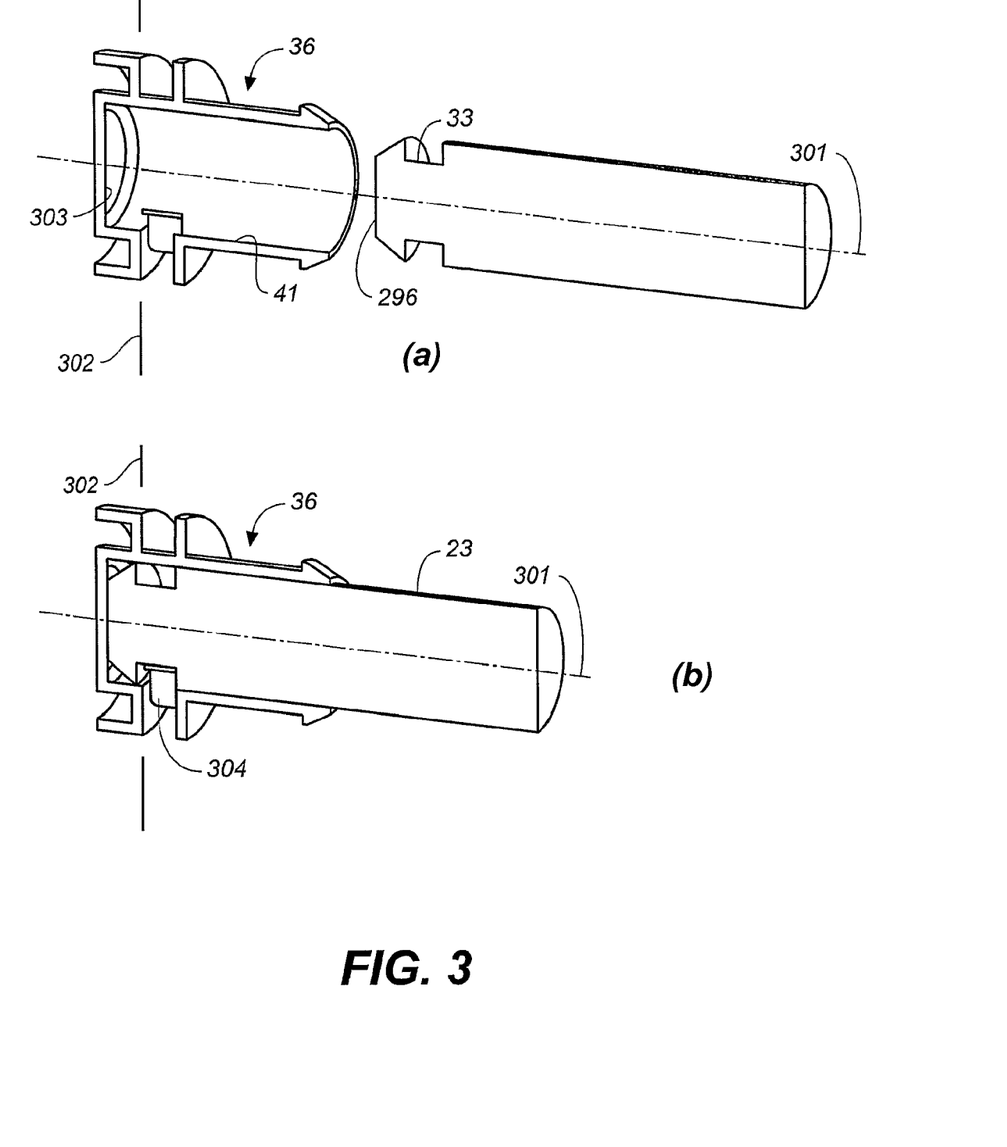

FIG. 3 is a series of cut-away views illustrating assembly of an embodiment of a sleeve body and a discrete retainer. In FIG. 3(a) and FIG. 3(b), the cut is in a plane containing a longitudinal axis 301. In FIG. 3(c)-(f), the cut is in a plane normal to the longitudinal axis and including line 302.

Together, FIG. 3(a) and FIG. 3(b) illustrate the sliding telescopic engagement of the axle and the sleeve body. In particular, as the axle 23 is inserted into an axle bore 41 of the sleeve body, axle tip 296 and notch 33 near an axle bore end 303 of the sleeve body, such that notch 33 aligns with lug portion 304 of retainer 305. For clarity, a wheel is not shown. See FIG. 2 instead for an assembly drawing. FIG. 3(a) shows the axle and sleeve body disengaged. FIG. 3(b) shows the axle and sleeve body engaged in telescopic relation, with the axle positioned in the axle bore such that the lug portion engages the notch to constrain and secure the axle within the axle bore.

FIG. 3(b) shows axle tip 296 bottomed-out at the end of axle bore 41. This relation is common, but is not essential, or necessary. For example, axle tip 296 need not abut directly against axle bore end 303 but may be spaced slightly inward from the end.

FIG. 3(c)-(f) show retainer 305 and sleeve body 36, and illustrate one mode of attaching the retainer to the sleeve body. As shown, discrete retainer 305 generally comprises a spring portion 308 and a lug portion 304. Preferably, the lug and spring portion of the retainer are monolithically formed. That is, they are formed from a single piece of material. In some respects, because of monolithic structure, the discrete retainer as a whole may be characterized as a spring. More accurately, however, the discrete retainer is in part a spring, and in part an axle-retaining lug. The spring portion principally provides a restoring force upon displacement. The lug portion, on the other hand, is primarily to engage with a portion of axle 23 and does not deform significantly. In the illustrated embodiment, the retainer also includes a lifting tab 306, and a catch portion 307. The lifting tab and catch portions are preferred, but optional. In this embodiment, the retainer in general and the spring portion in particular are formed in an arcuate band.

Figure 4:
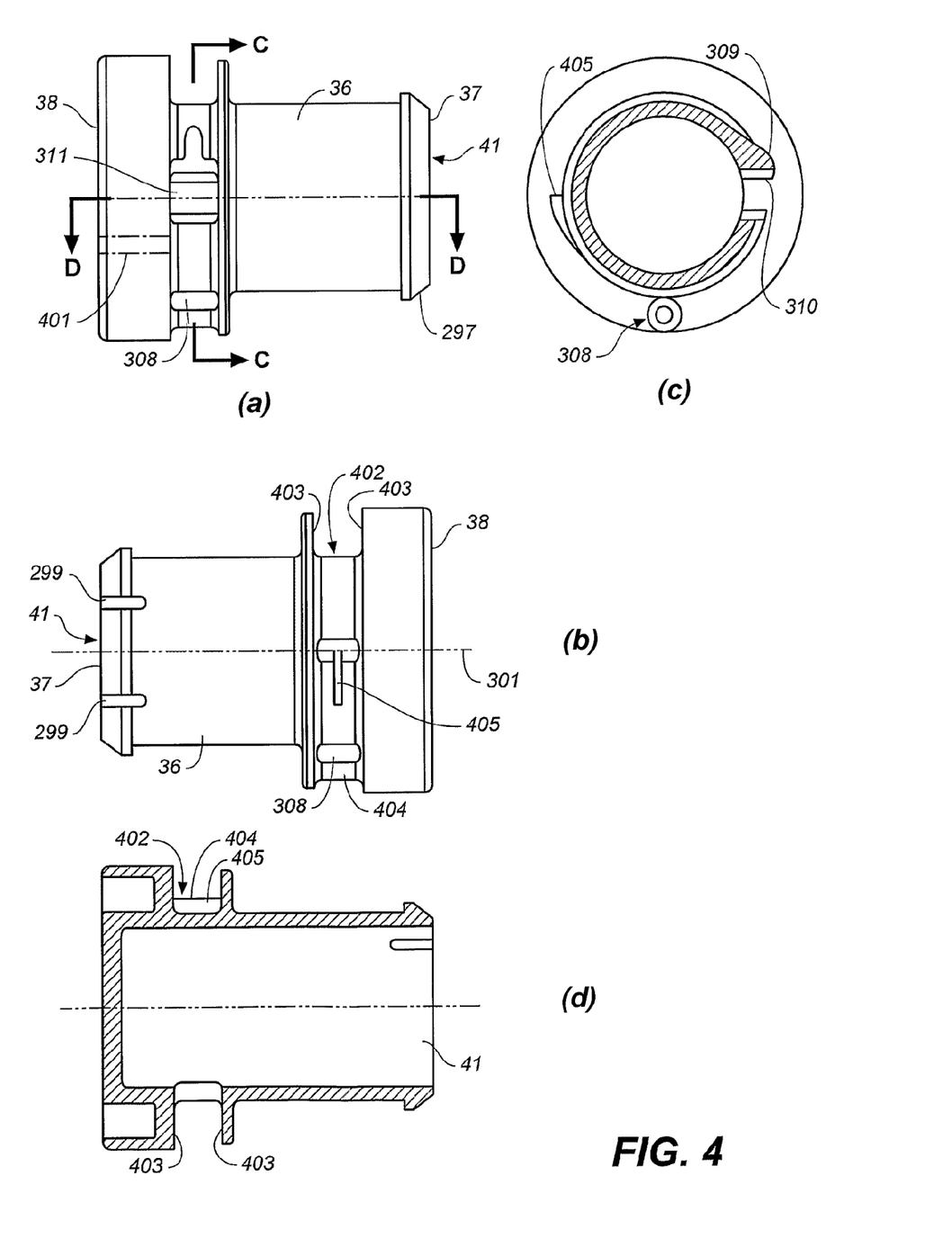

One will appreciate that FIGS. 3(c)-(f) show sleeve body 36 in a cut-away view taken substantially along a plane that is perpendicular to axis 301 of FIG. 3(a) and including axis 302. The salient features of the sleeve body shown in these views are locating portion 308 of the sleeve body, a ramp 309, a ramp shoulder 310, and a port 311. FIG. 4 will show plan views of this sleeve body.

As shown in FIG. 3(c), discrete retainer 305 is detachable from sleeve body 36. Attachment, or mounting, on the sleeve body for this embodiment is illustrated in the series (d)-(f) of FIG. 3. Catch portion 307 of the retainer is formed and dimensioned to engage locating portion 312 of the sleeve body, which here is a pivot. The hook and pivot together form a latch that constrains rotational motion of the retainer about longitudinal axis 301 (see FIG. 3(a)) once the attachment rotation or pivoting shown in the figures is complete. While a catch portion is not essential, it is preferable because it aids proper location of the lug portion as detailed below. In the illustrated embodiment, catch portion 307 is a hook and the locating portion 308 is a complementary dimensioned pivot rod, however, one will appreciate that other suitable locating configurations may be used.

Retainer 305 is configured to resiliently engage an outer surface of sleeve body 36. Thus, the sleeve body must be formed to provide access to axle bore 41 for a portion of the retainer. In the embodiment shown, port 311 is a rectangular hole through the sleeve body to the axle bore which provides such access. With access to the axle bore, a lug portion 304 of the retainer is located such that it is resiliently positionable through the port and into the axle bore to a detent position wherein the lug portion extends into axle bore 41 such that it may engage notch 33 of axle 23 when the notch is properly aligned (see FIG. 3(b)).

To locate the retainer and lug portion, the retainer may be attached to the sleeve body as shown in FIG. 3(d)-(f). When the lug portion approaches the port, ramp 309, located adjacent to the port, acts as a guide to the lug portion and displaces spring portion 308 of retainer 305. Such loading of the spring portion enables a forceful self-directing of the lug portion into the port after engagement of ramp shoulder 310. As the lug portion extends through the port under spring force, the ramp shoulder acts as a guide for the lug portion to preserve alignment of the lug portion and port. As well, the ramp shoulder acts as a constraint for rotational motion of the lug portion. Simply put, the ramp shoulder is tall enough to prevent the lug portion from misaligning.

Once mounted as illustrated in FIG. 3(f), retainer 305 is set to engage axle 23, as sleeve body 36 slides over the axle. As axle tip 296 (see FIG. 3(a), FIG. 3(b)) engages lug portion 304, lug portion 304 is biased away from a detent position within axle bore 41. The bias loads spring portion 308, and enables a forceful self-directing of the lug portion through port 311 to its detent position within the axle bore as notch 33 comes into alignment with the port. During this biasing, ramp shoulder 310 acts as a guide for the lug portion as well as a constraint for rotational motion of the lug portion, which would misalign the lug portion and port. With the lug portion thus located within the notch of the axle, the axle is constrained within the axle bore.

The embodiment shown in FIG. 3 is but one example of retainer 305. In other embodiments, the retainer need not include a catch portion 307 or a lift tab 306, or they may be differently shaped and dimensioned. See FIG. 4 and FIG. 5. As well, other embodiments of the retainer may be formed from cylindrical stock or wire, as compared to flat stock. Moreover, other embodiments may include more than one retainer configured to engage one or more axle notches.

The embodiment shown in FIG. 3 is but one example of sleeve body 36 as well. Alternate embodiments of sleeve body 36 need not include a locating portion, or pivot 308. Still other embodiments may have differently dimensioned ports 311, or a plurality of ports. In the illustrated embodiment, the sleeve body includes ramp 309 and ramp shoulder 310. One will appreciate, however, that a sleeve body may be provided without a ramp and ramp shoulder in accordance with the present invention.

Moreover, the assembly sequence shown in FIG. 3 is but one assembly sequence in accord with the invention. For example, in an alternative embodiment in which locating portion 312 of sleeve body 36 is an interference fit structure and catch portion 307 is locally flat (not, respectively, a pivot and hook arrangement as shown in FIG. 3), attachment may commence by positioning lug portion 304 in port 311 and fitting the catch and locating portions subsequently.

In complement to FIG. 3, which illustrates assembly, FIG. 4 is a series of more detailed side and sectional views illustrating the sleeve body of FIG. 3.

FIG. 4(a)-FIG. 4(b) show side elevational views of sleeve body 36 including, as in FIG. 2 and FIG. 3, inner end 37, outer end 38, axle bore 41, port 311, pivot 308, circumferential rib 297, slots 299, and longitudinal axis 301. Further, passageway 401, channel 402, channel walls 403, channel bottom 404, and riblet 405 are enumerated. The passageway (here shown by a hidden line) extends inward from the outer end and provides access for a tool to reach a lifting tab or a lug portion of a mounted retainer (not shown here for the sake of clarity). An operator may insert a tool through the passageway to effect unfastening of the axle and sleeve body by moving the lug portion from its locking position in a notch of an axle. The channel is a circumferentially extending furrow that is formed and dimensioned to receive the retainer (not shown), and located along the longitudinal axis such that the port coincides with the channel bottom. As such, the channel has a dual effect of constraining motion of the retainer along the longitudinal axis and locating the lug portion of the retainer at a position along the longitudinal axis of the sleeve body that corresponds to the position of the port. While advantageous and preferred, the channel is not essential. Rather, it is optional. The riblet, or small rise, is disposed on the channel bottom, typically opposite the port. In the illustrated embodiment, the riblet rises less than the ramp adjacent to the port, however, one will appreciate that the height of the riblet may be taller, shorter or equal to that of the ramp. The riblet has an effect of compensating for small discrepancies in retainer curvature, which are residual artifacts of manufacture for some retainer embodiments. Accordingly, the riblet is also optional.

Figure 5:
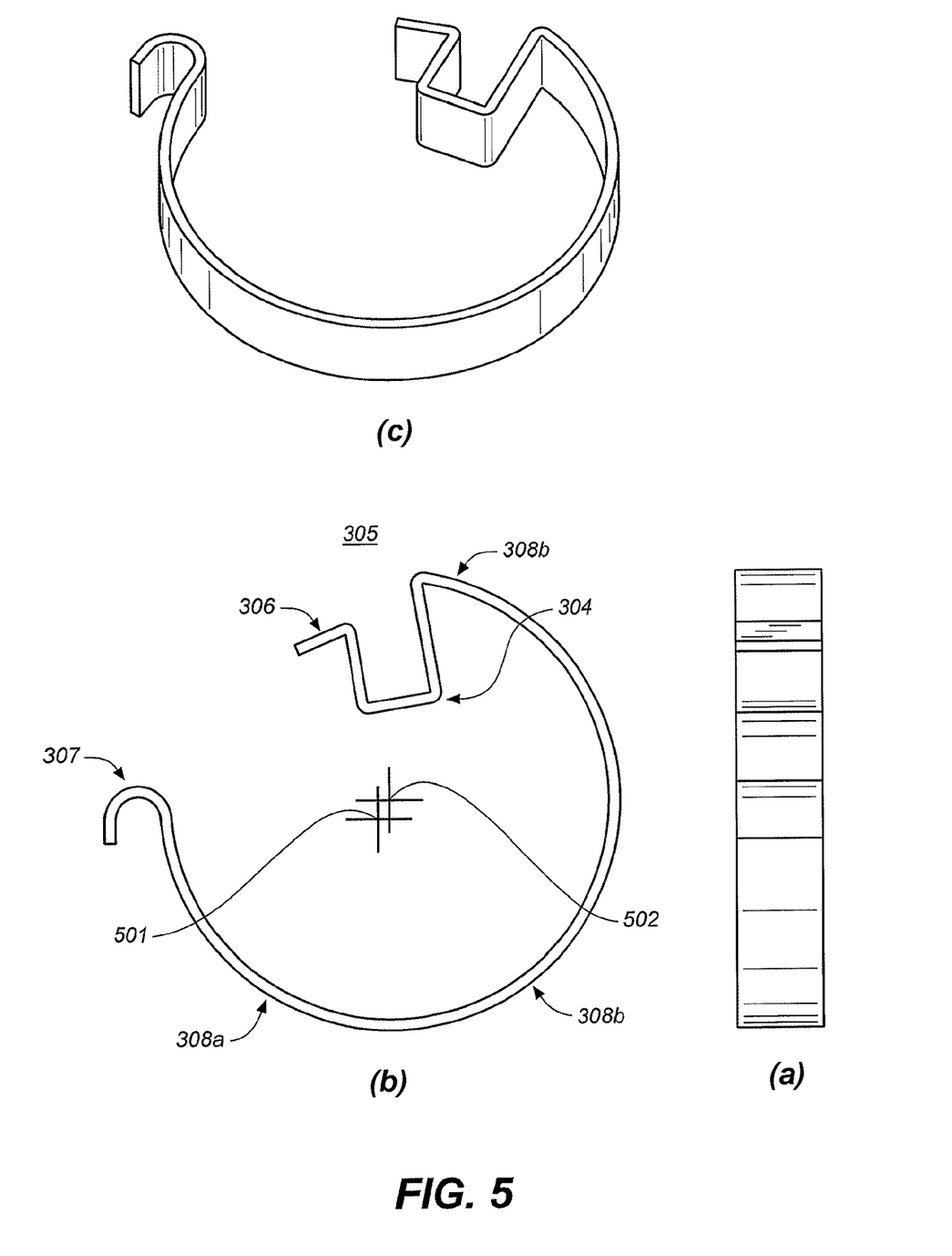

FIG. 5 is a series of views illustrating a preferred embodiment of a retainer. As in preceding figures, FIG. 5 shows retainer 305, lug portion 304, spring portion 308, catch portion 307, lifting tab 306. Further, first center of curvature 501 and second center of curvature 502 are enumerated.

As shown, spring and lug portions 308 and 304, respectively, are monolithically formed. Indeed, in this embodiment the spring and lug portions as well as optional catch portion 307 and optional lifting tab 306 are formed from the same monolith. Moreover, the spring portion is arcuate and comprises a centric portion 308a centered on first center of curvature 501, and an eccentric portion 308b centered away from the first center of curvature at a second center of curvature 502. Having two centers of curvature is in some embodiments advantageous for assuring there is adequate clearance with ramp 309 when the retainer is mounted on the sleeve (see FIG. 4(a)).

Retainer 305, as shown in FIG. 5, is formed in a band shape. Preferably, the arcuate band is formed of flat metal stock. Most preferably, the flat metal stock has rounded edges. For material, metals such as steel, aluminum, or brass are preferred, however, one will appreciate that other suitable materials may be used. Other embodiments may be formed from non-metallic material, or metallic or non-metallic round stock such as wire, or any combination thereof.

FIG. 5 shows a retainer 305 having a modified optional lifting tab 306, as compared to the retainer embodiment in FIG. 3. In FIG. 5, this lifting tab is monolithic and formed from the same band material as the lug, spring and catch portions 304, 308, and 307 respectively. In contrast to the embodiment in FIG. 3, however, the lifting tab in FIG. 5 is straight, not an arcuate semi-circle as in FIG. 3. Moreover, the straight lifting tab shown in FIG. 5 is closer to the centers of curvature 501 and 502 than the semi-circular lifting tab in FIG. 3. Such a lower profile may facilitate displacing the lug portion with a hand tool through passageway 401 (see FIG. 4). Many other forms of lifting tabs are immediately apparent.

Referring still to FIG. 5, simple bends form lug portion 304 from the band material. A rectangular shape as in FIG. 5 is often adequate for the lug portion, especially when used with a standard axle having a beveled axle tip (see for example FIG. 2). So long as one or the other or both of the lug portion or axle tip have a ramp-like face, galling or seizure of the lug portion is unlikely.

Figure 6:
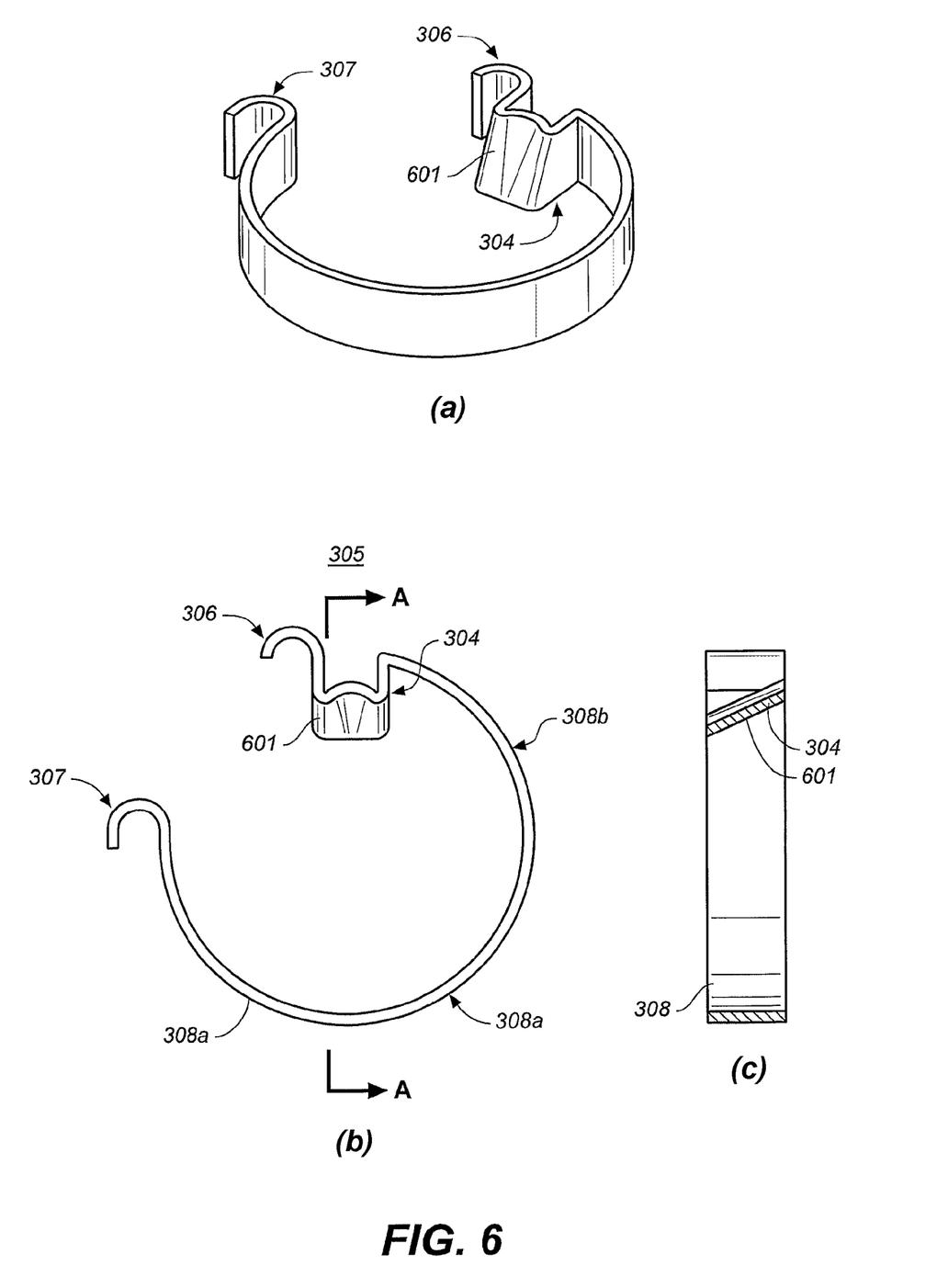

FIG. 6 is a series of views illustrating an alternate embodiment of retainer 305. As in preceding figures, catch portion 307, spring portion 308, lifting tab 306 and lug portion 304 are shown. With respect to the lug portion, the embodiment in FIG. 6 has ramp face 601 for biasing the lug portion of the retainer away from the detent or engaged position as the axle engages the lug portion during insertion into the axle bore 41 (see FIG. 3(a), FIG. 3(b)). This embodiment is well-suited for standard axles as in FIG. 2, as well as for axles lacking an end chamfer (not shown). Again, so long as one or the other of the lug portion or axle tip have a ramp-like face, galling or seizure of the lug portion is unlikely. Thus, this embodiment is more universal in that it may be used with chamfered and non-chamfered axles.

Figure 7:
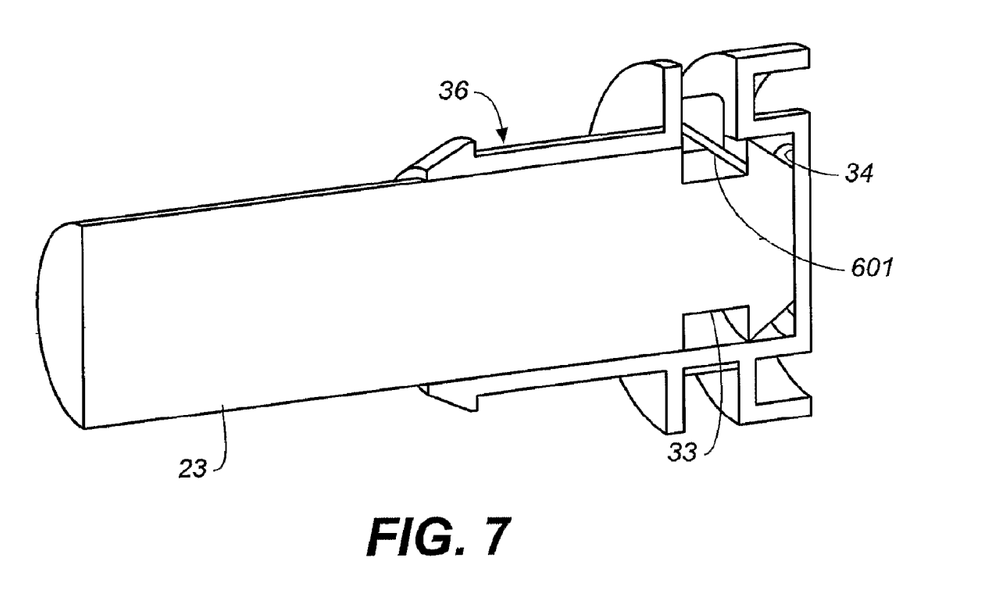
FIG. 7 is a cut-away perspective view illustrating the retainer of FIG. 6 mounted on a sleeve body and engaged with a notched axle.

FIG. 7 is a cut-away perspective view illustrating the retainer of FIG. 6 mounted on a sleeve body and engaged with a standard notched axle. The cut is through a plane containing longitudinal axis 301 (see FIG. 3). Axle 23, notch 33, sleeve body 36 and ramp face 601 are identified. As described above, the ramp face 601 engages with chamfer 34 of the axle tip. (see FIG. 2) to bias the ramp face away from a detent position within the axle bore as the chamfer slides across the ramp face. After passage, the ramp face and lug portion spring back to the detent position, which is now within the notch. Thus, the axle is constrained within the sleeve body.

The foregoing description of specific embodiments of this invention has been presented for the purposes of illustration. It is not intended to be exhaustive or to limit the invention to the precise forms disclosed. Clearly, many modifications and variations are possible in light of the teaching, above. The embodiments were chosen and described in order to best explain the principles of the invention and its practical application in order to thereby enable a skilled person to utilize the invention and various embodiments and modifications that are suited to the use contemplated. It is intended that the scope of the invention be defined by the claims below, when read and interpreted according to accepted legal principles.

What is claimed is:

1. In a wheel-mounting sleeve including a sleeve body, formed and dimensioned to mount through a wheel-bearing bore in a wheel and into telescoped relation over an axle including a retaining notch, the sleeve body including an inner end and an outer end with an axle bore there between, the axle bore dimensioned to receive the axle in telescoped relation, an improvement comprising:
   the sleeve body including a port formed and dimensioned to access the retaining notch of the axle when positioned in the axle bore; and
   at least one arcuate retainer discrete from the sleeve body, the at least one arcuate retainer comprising monolithic spring and lug portions, and coupled to the sleeve body such that the lug portion is resiliently positionable through the port and into the axle bore to a detent position wherein the lug portion engages the retaining notch of the axle within a wheel-bearing bore in a wheel to constrain the axle within the axle bore.

2. The wheel-mounting sleeve of claim 1, wherein the at least one retainer is detachable from the sleeve body.

3. The wheel-mounting sleeve of claim 1, wherein the at least one retainer includes a lifting tab portion configured to disengage the lug portion from the retaining notch of the axle, and wherein the sleeve body includes a passageway from the outer end to the axle bore to access the lug portion with a tool to unfasten the wheel from the axle.

4. The wheel-mounting sleeve of claim 1, wherein the at least one retainer includes a catch portion formed and dimensioned to engage a locating portion of the sleeve body to form a latch constraining the at least one retainer with respect to the sleeve body.

5. The wheel-mounting sleeve of claim 4, wherein the locating portion is a pivot and the catch portion is a hook formed and dimensioned to engage the pivot to constrain rotational motion of the at least one retainer about a longitudinal axis of the sleeve body.

6. The wheel-mounting sleeve of claim 1, wherein the at least one retainer is an arcuate band formed from flat metal stock.

7. The wheel-mounting sleeve of claim 6, wherein the arcuate band has at least one rounded edge, which extends along the band.

8. The wheel-mounting sleeve of claim 6, wherein the at least one arcuate band includes centric and eccentric portions.

9. The wheel-mounting sleeve of claim 6, wherein the lug portion of the at least one arcuate band includes a ramp face configured to engage a tip of the axle to bias the at least one arcuate retainer away from the detent position as the axle is inserted into the axle bore.

10. In a wheel-mounting sleeve including a sleeve body, formed and dimensioned for mounting through a wheel-bearing bore in a wheel and into telescoped relation over an axle having a retaining notch, the sleeve body having an inner end and an outer end with an axle bore therebetween, the axle bore dimensioned for receiving the axle in telescoped relation, an improvement comprising:
   the sleeve body having a port formed and dimensioned for access to the retaining notch of the axle when positioned in the axle bore, wherein the sleeve body includes a channel having a channel bottom and channel sides, wherein
      the channel is formed and dimensioned to receive the arcuate band; and
      the channel bottom coincides with the port,
      the channel thereby having a dual effect of constraining motion of the arcuate band along a longitudinal axis of the sleeve body and locating the lug portion of the arcuate band at a position along the longitudinal axis of the sleeve body that corresponds with the position of the port along the longitudinal axis of the sleeve body; and
   at least one retainer discrete from the sleeve body, the at least one retainer comprising monolithic spring and lug portions, and coupled to the sleeve body such that the lug portion is resiliently positionable through the port and into the axle bore to a detent position wherein the lug portion engages the retaining notch of the axle to constrain the axle within the axle bore, wherein the at least one retainer is detachable from the sleeve body, wherein the at least one retainer is an arcuate band formed from flat metal stock.

11. The wheel-mounting sleeve of claim 10, wherein the sleeve body includes a ramp adjacent to the port and within the channel and a ramp shoulder above the port for engaging the lug portion, the ramp having a dual effect of acting as a guide for the lug portion and displacing the spring portion, and the ramp shoulder having a dual effect of acting as a guide for the lug portion and as constraint for rotational motion of the lug portion about a longitudinal axis of the sleeve body as the lug portion is biased away from the detent position.

12. A wheel-mounting sleeve usable with an axle including a retaining notch, the wheel-mounting sleeve comprising:
   a sleeve body formed and dimensioned to mount through a wheel-bearing bore in a wheel and retaining the wheel on the sleeve;
   the sleeve body including an inner end and an outer end with an axle bore therebetween, the axle bore formed and dimensioned to receive the axle in telescoped relation;
   at least one arcuate retainer discrete from the sleeve body, the at least one arcuate retainer comprising monolithic spring and lug portions; and
   the sleeve body including at least one port formed and dimensioned to receive the lug portion;
   wherein the spring portion is formed and dimensioned to resiliently extend the lug portion of the at least one arcuate retainer through the at least one port of the sleeve body and relative to the axle bore to form a latch between the sleeve body and the axle within a wheel-bearing bore in a wheel.

13. The wheel-mounting sleeve of claim 12, wherein the at least one retainer includes a lifting tab portion configured to disengage the lug portion from the retaining notch of the axle, and the sleeve body includes a passageway from the outer end to the axle bore to access the lug portion with a tool to unfasten the wheel from the axle.

14. The wheel-mounting sleeve of claim 12, wherein the at least one retainer includes a catch portion formed and dimensioned to engage a locating portion of the sleeve body to form a latch constraining the at least one retainer with respect to the sleeve body.

15. The wheel-mounting sleeve of claim 14, wherein the locating portion is a pivot and the catch portion is a hook formed and dimensioned to engage the pivot to constrain rotational motion of the at least one retainer about a longitudinal axis of the sleeve body.

16. The wheel-mounting sleeve of claim 12, wherein the lug portion of the at least one arcuate band includes a ramp face to engage a tip of the axle to bias the at least one arcuate retainer away from the detent position as the axle is inserted into the axle bore.

17. A wheel-mounting sleeve for use with an axle having a retaining notch, the wheel-mounting sleeve comprising:

a sleeve body formed and dimensioned for mounting through a wheel-bearing bore in a wheel and retaining the wheel on the sleeve;

the sleeve body having an inner end and an outer end with an axle bore therebetween, the axle bore formed and dimensioned for receiving the axle in telescoped relation;

at least one retainer discrete from the sleeve body, the at least one retainer comprising monolithic spring and lug portions; and the sleeve body having at least one port formed and dimensioned to receive the lug portion, wherein the sleeve body includes a channel having a channel bottom and channel sides, wherein the channel is formed and dimensioned to receive the at least one retainer; and the channel bottom coincides with the at least one port, the channel thereby having a dual effect of constraining motion of the retainer along a longitudinal axis of the sleeve body and locating the lug portion of the at least one retainer at a position along the longitudinal axis of the sleeve body, wherein the lug portion extends through the at least one port along the longitudinal axis of the sleeve body;

wherein the spring portion is formed and dimensioned to resiliently position the lug portion of the at least one retainer relative to the axle bore to form a latch between the sleeve body and the axle.

18. The wheel-mounting sleeve of claim 17, wherein the sleeve body includes a ramp adjacent to the at least one port and within the channel and a ramp shoulder above the at least one port for engaging the lug portion, the ramp having a dual effect of acting as a guide for the lug portion and displacing the spring portion, and ramp shoulder having a dual effect of acting as a guide for the lug portion and as constraint for rotational motion of the lug portion about a longitudinal axis of the sleeve body as the lug portion is biased away from the detent position.

19. An assembly, comprising:

a wheel assembly including a wheel-bearing bore extending therethrough from an inner side to an outer side;

a sleeve body formed and dimensioned to mount through the wheel-bearing bore and retaining the wheel on the sleeve body, the sleeve body including an inner end and an outer end with an axle bore therebetween, the axle bore formed and dimensioned to receive an axle including a retaining notch in telescoped relation; and at least one arcuate retainer discrete from the sleeve body, the at least one arcuate retainer comprising monolithic spring and lug portions, the sleeve body including at least one port formed and dimensioned to receive the lug portion therethrough, wherein the spring portion is formed and dimensioned to resiliently position the lug portion of the at least one arcuate retainer relative to the axle bore to form a latch between the wheel assembly and the axle, the latch formed within the wheel-bearing bore of the wheel.

20. The assembly of claim 19, further comprising a rotational constraint to maintain an angular position of the lug portion about a longitudinal axis.

21. The assembly of claim 19, wherein the sleeve body comprises a ramp adjacent to the at least one port and configured to guide the lug portion and to displace the spring portion outwardly.

* * * * *

UNITED STATES PATENT AND TRADEMARK OFFICE
CERTIFICATE OF CORRECTION

| | | |
|---|---|---|
| PATENT NO. | : 7,377,597 B2 | |
| APPLICATION NO. | : 11/059153 | |
| DATED | : May 27, 2008 | |
| INVENTOR(S) | : Michael A. Morris | |

It is certified that error appears in the above-identified patent and that said Letters Patent is hereby corrected as shown below:

At column 4, line 23, delete "readily." and insert -- readily --, therefor.

At column 8, line 63, after "36" insert -- , --.

At column 8, line 65, delete "tip." and insert -- tip --, therefor.

At column 11, line 38, in Claim 17, before "retainer" insert -- at least one --.

Signed and Sealed this

Eleventh Day of August, 2009

David J. Kappos
*Director of the United States Patent and Trademark Office*